United States Patent [19]

Campman

[11] 3,803,572
[45] Apr. 9, 1974

[54] INTRUSION DETECTING APPARATUS
[75] Inventor: James P. Campman, Silver Spring, Md.
[73] Assignee: Vidar Laboratories, Inc., Kensington, Md.
[22] Filed: Mar. 15, 1973
[21] Appl. No.: 341,706

[52] U.S. Cl............... 340/258 B, 250/221, 338/15, 338/17, 340/276
[51] Int. Cl. ............................................ G08b 13/18
[58] Field of Search ........ 340/258 B, 258 D, 228 R, 340/228 S; 250/221; 338/15, 17

[56] References Cited
UNITED STATES PATENTS
2,866,878  12/1958  Briggs et al. .................. 338/15 X
3,036,219   5/1962  Thompson.................. 340/258 B X
3,188,593   6/1965  Vasel et al. .................. 340/228 R X
3,444,544   5/1969  Pearson et al................... 340/258 B
3,480,775  11/1969  Osborne...................... 340/258 D X Primary Examiner—David L. Trafton
Attorney, Agent, or Firm—Jack H. Linscott

[57] ABSTRACT

An apparatus for detecting motion within a field of view of a lens system having a retina forming a sensitive grid structure across which an image of a movable object travels to produce an alternating voltage of a frequency such that the least amount of movement will produce an indication, and means associated therewith for processing the signal to eliminate the signals having frequencies other than those produced by an image of a movable object traversing the cells and grid structures thereof at a speed within a predetermined range of speeds.

9 Claims, 5 Drawing Figures

INTRUSION DETECTING APPARATUS

The present invention is an improvement on my invention disclosed in the applications Ser. No. 248,211, filed Apr. 27, 1972 and Ser. No. 323,751, filed Jan. 15, 1973.

The present invention is directed more particularly to the structure of the sensory means of the apparatus.

In the first application, the sensory means comprised of a plurality of photocells, all of the same type affixed to the surface of a spherical lens. In that structure there was no distinct image of the field of view. Instead, the cells were subjected to hazy shadows of the objects in the field of view. The primary object of that structure was to obtain a wide angle of view, even approaching omnidirectionality.

In the second application, above mentioned, the sensory means comprised of a plurality of cells, the cells being of two distinct types, having optimum responses at opposite ends of the visible light spectrum, mounted in a retina in a surface spaced at the focal distance from the lens, whereby a sharp image of the field of view was obtained on the surface of the cells. The primary object of that invention was to obtain automatic adjustment of the sensory means to changing light levels whereby, the sensory means would be substantially uniformly responsive over the entire range of changes of light level.

The present invention comprises a plurality of cells of the same type, or alternatively, of more than one type, arranged in a spherical surface at the focal length of the lens, wherein a sharp image is projected upon the cell surfaces, wherein the cells are oriented in such a manner that the serpentine configuration of the sensitive portion thereof forms a grid traversing the direction of travel of the image of a moving object in the field of view, the size of the image produced by the lens means is so related to the retina that the image of the object projected on the cell surface will always be less in area than the area of the cell, whereby, as the image traverses the cell surfaces it will produce voltage signals at the output of the retina which will have components of two frequencies, one due to the traversal of the grid structure and the other due to the traversal of the individual cells. The object is to improve the sensitivity and reliability of the sensory means, whereby, smaller motions will be detected and while at the same time retaining the same response of the sensory means to larger motions.

It is an object of the present invention to improve the response characteristic of a detector apparatus, whereby the amount of motion in the field of view of the apparatus required to initiate an alarm can be predetermined and reduced to a minimum.

Another object of the invention is to provide a detecting apparatus, primarily designed for operation in an enclosed space of more or less restricted dimensions, such as a room of a home, office or small shop wherein the depth of the field of view is comparatively short.

Still another object of the invention is to provide a detecting apparatus having great sensitivity and reliability at a minimum cost and of maximum simplicity.

Other objects of the invention will become obvious as the disclosure proceeds.

The sensory means of the present invention, for illustrative purposes, is applied to an intrusion detector apparatus, for producing an alarm signal or indication when there has been an intrusion by a person in the space viewed by the apparatus. In prior sensory means of the same general character, in operation is very close quarters, the response was more or less restricted to that produced as the image of the intruder moved from cell to cell, because, with such short depths of view the image of the intruder would be larger than the area of the cells. To detect small degrees of motion and to provide capabilities in the apparatus for greater discrimination between a signal produced by an intruder and that produced, for example, by a moving pattern of light it is essential to project the image of the field of view over the entire retina so that the image of an intruder would be small compared to the individual cells and so that as the image of the intruder traverses the grid structure of the cells, a signal of higher frequency will be produced.

This utilization of the structure of the cells to produce the required higher frequency signal, enables the difference of signals for example, due to a moving light pattern and a moving intruder to be increased, or more widely separated in frequency and makes the apparatus more discriminating and thus more reliable due to reduction of causes of false alarms.

High sensitivity usually results in a lower degree of reliability, but, in this instance, the reliability is improved by the improvement of the discrimination characteristics.

In the present invention the sensory means is constructed to take advantage of the individual cell structure, to provide a predetermined characteristic to the signal voltage, whereby, the apparatus can be more discriminating in its response and thus more reliable as well as more sensitive.

Figure 1:
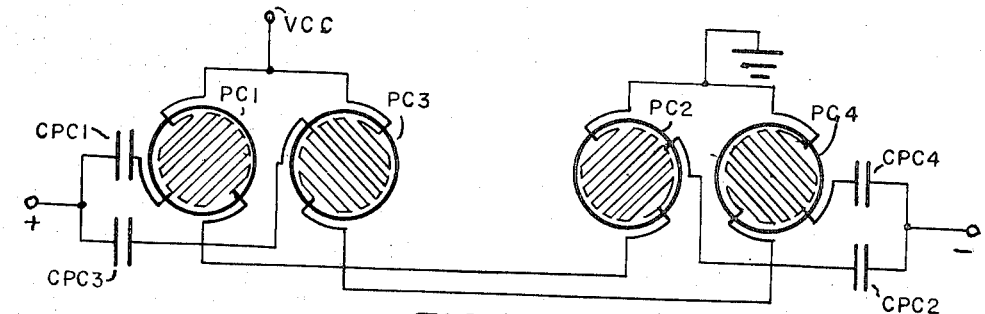
FIG. 1 is a schematic view of the photo resistance cells that comprise the retina that provide a sensory means of the detecting apparatus.

In FIG. 1 is disclosed an array of four cells PC1, PC3, PC2 and PC4, arranged in that order in the equatorial plane of a lens to form a retina. The cells individually comprise, of a serpentine-like configuration of sensitive material such as cadmium selenide. The cells may if desired have a deposit of cadmium sulphide material. The material is deposited on a flat surface of an insulating material. The serpentine configuration forms a grid structure covering the surface of the cells and is connected at their ends and intermediate points to terminals. The cells are connected to each other in an array, in the present example, as a bridge circuit with one end terminal of cells PC1 and PC3 connected to a positive source of potential, the other end terminals of which are connected respectively to the end terminals of cells PC2 and PC4. The remaining end terminals of cells PC2 and PC4 are connected through ground to the negative terminal of the source of potential.

The intermediate terminals of the cells PC1 and PC3 are coupled respectively through capacitors CPC1 and CPC3 to one output terminal of the bridge. The intermediate terminals of the cells PC2 and PC4 are coupled respectively through capacitors CPC2 and CPC4 to the other output terminal of the bridge.

Figure 1A:
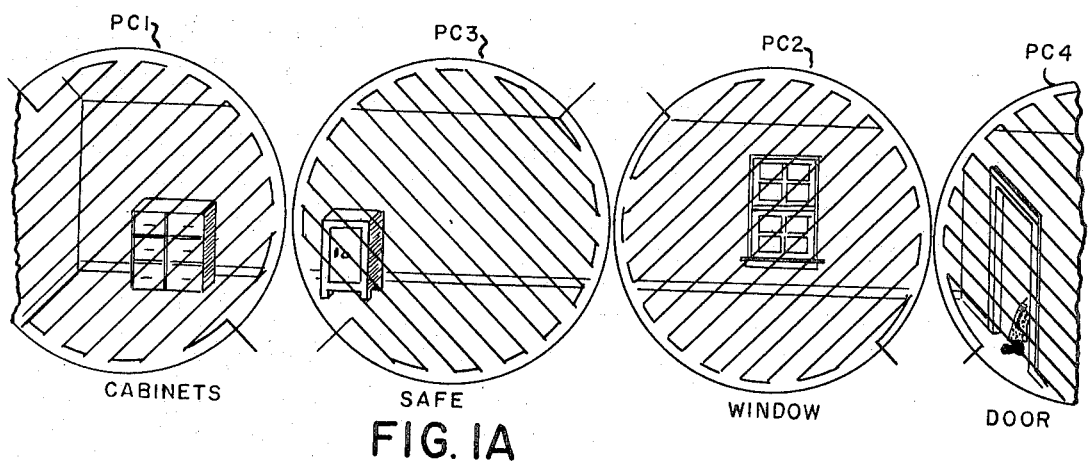
FIG. 1A is a magnified fragmentary view of the cells of the retina, showing the orientation of the serpentine sensitive portion thereof relative to an image of a room projected on the cell surface.

As shown clearly in FIGS. 1 and 1A, the orientation of the cells is such, that the serpentine configuration of the sensitive material forms a grid structure that traverses the horizontal and or vertical paths of possible motion of the image of the intruder on the cells. The cells are oriented also such that adjacent cells will have the grids thereof oriented at ninety degrees relative to the orientation of the grids of each of the adjacent cells.

Figure 2:
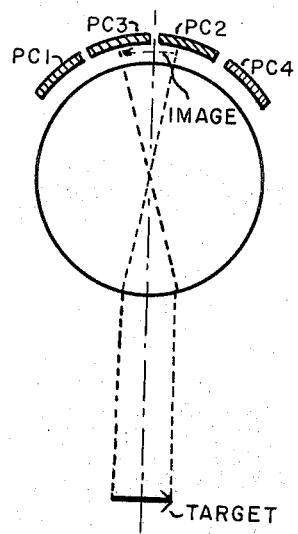
FIG. 2 is a diagrammatic view of the retina and lens means of the sensory means.

In FIG. 2 is a diagramatic view of the spherical lens partly in section, wherein cells PC1, PC3, PC2 and PC4 are arranged in that order in the spherical-like surface at the focal length of the lens. The target, as for example, the body of an intruder would be projected upon the retina of the lens and would traverse the separate cells individually as well as the grid structures thereof.

The lens system is designed such as to produce an image of the space within its view, upon all of the cells simultaneously, various portions of the space being projected on each of the cells, as shown in FIG. 1A. FIG. 1A represents an image of a room having file cabinets, a safe, a window and a doorway through which access to the room is had. The grid structures of the cells traverse the entire areas of the image of the room appearing on the cells, whereby, motion in any part of the room will produce a change in the light pattern on the grids and produce a response signal. To the right in FIG. 1A is a doorway in which a foot and part of a leg of an intruder about to enter the room. The introduction of the foot and leg produces and instantaneous change in the resistance of the serpentine sensitive coating of cell PC4. As the intruder progresses into the room more and more of the serpentine sensitive coating is covered by his image, thus gradually increasing the change in resistance of the coating of the cell PC4 and as each portion of the grid structure is traversed by a portion of the image of the intruder there will be a small alternation-like change in the resistance superimposed on the more gradual change in the resistance of the cell.

Figure 3:
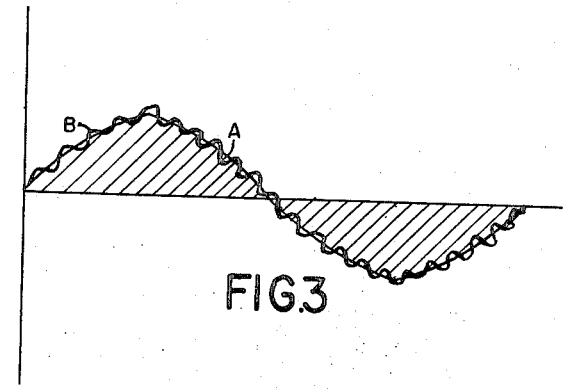
FIG. 3 is a chart disclosing the voltage variations from a single cell as the image of an intruder, as an example traverses the surface of said cell.

The changes so effected are depicted in FIG. 3, which is a chart showing a single alternation of the resistance changes caused by the traverse of the image of the intruder across the whole of the cell face, on which is superimposed an alternation of the changes of the resistance at a higher frequency, representative of the effect of the image of the intruder traversing the individual grids of the grid structure of the cell. It can be readily seen that whether the intruder moves transverse to the field of view or in a direction at right angles thereto, the grid structure would be traversed and his motion would be detected. In the chart the high frequency changes would be represented by the curve B, whereas, the lower frequency changes in represented by curve A. The traverse of the image of the intruder entirely across the room would, in the illustrated structure, produce at the most only four low frequency alternations of the changes of the resistance. However, in the traverse of the grid structure of each of the cells, there would be as many alternations of the change in the resistance as there are cells, multiplied by the number of grid traversed. Thus, because it is possible in the processing circuitry to detect the minute changes in voltage due to minute changes in the resistance caused by the traversal of the individual grids, it is possible to detect the most minute change in the pattern of the room and to predetermine the amount of movement of the intruder can make prior to initiating the sounding of an alarm.

That is, it separates the signals frequency-wise, due to the motion of an intruder and those due to an outside influence such as a pattern of light coming through the window of the room and traversing the walls of the room, as for example, those caused by a passing vehicle shining or reflecting light to produce the moving pattern. In the instance where there was only a response when the individual cells were traversed by the pattern, there would in both instances be four alternations. The difference between the signals produced in the two instances would be due to the relative speeds of the intruder and the pattern of light, which at most would be only a few cycles per second.

In the instance where the grids are used to produce alternations the small difference of a few cycles per second produced in the first instance would now be several times greater, thus, in effect, separating the signals produced in the two instances so that the processing circuitry can more readily segregate them.

Similarly, there is an improvement in the discriminating characteristic of the apparatus in discriminating between signals produced by an intruder and those produced by flashing lights, as from street signs, flickering lamps etc.

The sensory means as thus constructed produces a signal that is distinctive and more easily segregated from other signals thus making the apparatus more differentiating and more reliable.

Figure 4:
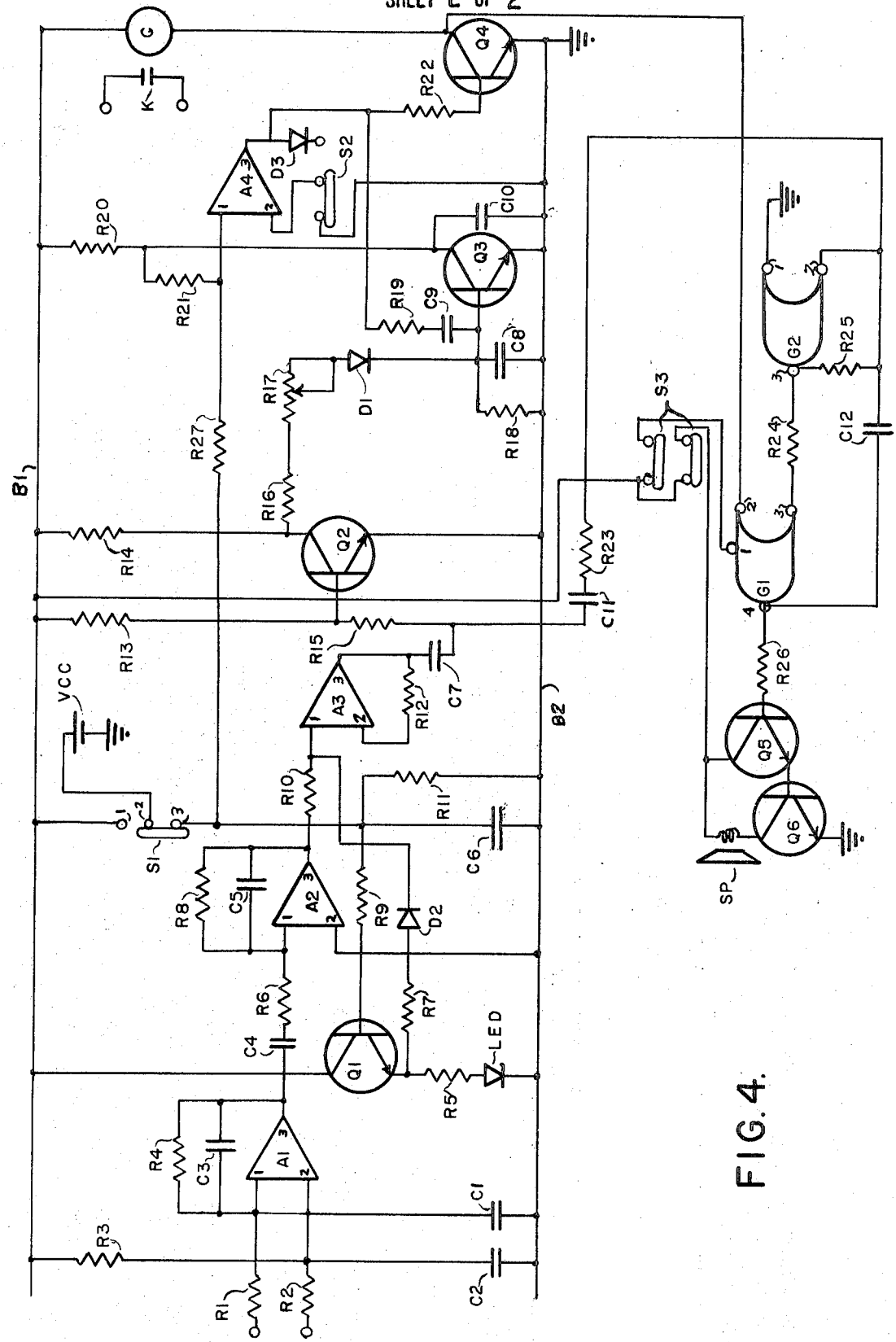
FIG. 4 is a schematic view of the circuitry used for processing the signal voltages produced by the sensory means and for initiating an alarm signal.

The array of cells as connected in a bridge circuit with a source of voltage converts the minute changes in the resistance of the cells into voltage variations coupled through the capacitors CPC1, CPC3, CPC2, and CPC4 to the terminals of the circuitry shown in FIG. 4.

It represents the signal processing circuitry of an intrusion detector apparatus. It receives a signal generated by the transducer or sensory means, which, embraces various, components, those produced by what transpires in the field of view of the sensory means and those produced in the sensory means itself by reason of its structure.

The signal is processed to eliminate those components of the overall signal which cannot be attributed to the act of intrusion, as for example, those components having characteristic frequencies outside the range of frequency that would be produced by an intrusion. It also operates to eliminate the signals which are produced by influences other than intrusion and passes only those signals having a predetermined frequency characteristic. The passed signals and or components of a signal having the acceptable characteristics, are alone amplified. The residue signal components and signals are then transformed into a signal providing a number of pulses of uniform width and amplitude, a pulse for each cell traversed by the image of the intruder, and a pulse for each change in the number of grids traversed by the image. The pulses of uniform width and amplitude are fed to a storage means, which has a constant bleed rate. Thus, pulses having a frequency above a predetermined value as determined by the bleed rate, will produce a voltage in the storage means having a value adequate to trigger an alarm signal and call attention to fact that an intrusion has occurred. Not only must there be a predetermined of pulses per second, but also, there must be a predetermined number of pulses for the alarm to be triggered. In this way, false alarms are reduced to an absolute minimum with out any sacrifice of sensitivty.

The signal from the transducer or sensory means is conveyed to a differential type amplifier A1 by the resistors R1, R2 and capacitors C1, C2, which constitute a low pass filter, which eliminates those components of the signal and signals having frequencies outside the range of the band pass filter. The differential amplifier A1 has a feedback circuit comprising of resistor R4 and capacitor C3, that act as a filter, to further eliminate those components having frequencies outside the range of the band pass. Thus, the amplifier A1, itself, operates to amplify only those components of the signal that are within the acceptable range of frequencies and in effect attenuates those signals and components that have frequencies outside the band pass range. Resistor R3 provides the proper bias voltage for the amplifier A1.

The output of the differential amplifier A1 is coupled through capacitor C4 and resistor R6 to terminal 1 of the post amplifier A2. Post amplifier A2 also has a feed back circuit having a filtering function comprised of resistor R8 and capacitor C5, to further attenuate the signals and components thereof having frequencies outside the bandpass of interest. The output of the post amplifier A2 is composed of signals of varying amplitudes and widths, as determined by the amplitude of light modulation and duration of each change in the light pattern on the retina of the sensory means.

The signal appearing at the output terminal of the post amplifier A2 is direct coupled to level detector amplifier A3 though coupling resistor R10. Resistor R12 establishes the proper bias and feed back level. The output of level detector A3 is a pulse of uniform amplitude but of random width. It is desirable to have pulses of uniform amplitude and width such that a small movement or a bright flash of light would represent the same amount of energy content in the pulses. This is accomplished by differentiating the signal appearing at level detector amplifier terminal 3.

The output from level detector A3 is coupled through capacitor C7, resistor R15 to the base of transistor Q2. The resistor R13 operates as a bias resistor to determine the bias voltage of the base terminal of transistor Q2. The collector of transistor Q2 is connected by load resistor R14 to voltage buss B1 and its emitter is connected to the grounded buss B2. When transistor Q2 is non-conductive the voltage at its collector will be high, and when it is conductive the voltage on its collector is at its lowest level, or substantially that of the grounded buss B2. When there is no signal on the base of transistor Q2, it is normally conductive and its collector is normally at ground potential. A negative pulse produced at its base through resistor R15 and capacitor C7 will produce a cessation of the conductivity of transistor Q2 for as long as the pulse exists. The length of the pulse is determined by the time constant of the RC circuit R15, C7. Thus the output from the collector of transistor Q2 will be positive in nature and will have a uniform amplitude and width.

The collector of transistor Q2 is coupled through resistor R16, potentiometer R17 and diode D1 to the storage or memory capacitor C8, that has a bleed resistor R18 coupled in shunt therewith. The bleed resistor may if desired be a potentiometer whereby the bleed rate may be adjusted to suit requirements of different conditions dictated by the environment in which the apparatus is to be used.

The positive pulses coupled from the collector of the transistor Q2 to the capacitor C8 tend to charge the capacitor, if the number of pulses per second exceeds the number of pulses per second bled from the capacitor. The voltage across the capacitor C8 indicates the number of pulses that are in storage in the capacitor at any instant up to that of the trigger level of the alarm as established by the base-emitter bias of transistor Q3.

The voltage across the capacitor C8 is coupled across the base-emitter circuit of transistor Q3, which is normally non-conductive. The transistor Q3 has its collector connected through load resistor R20 to the voltage buss B1 and its emitter connected to grounded bus B2. Its collector is further connected through resistor R21 to terminal 1 of amplifier A4, whose output terminal 3 is connected through resistor R22 to the base of transistor Q4. Transistor Q4 has its collector coupled in series through a relay coil C to the voltage buss B1 and its emitter connected directly to the grounded buss B2.

When the charge on the capacitor C8 reaches a predetermined level, as determined by the bias on the base of transistor Q3, transistor Q3 becomes conductive, producing a voltage drop across resistor R20. This voltage drop is coupled through resistor R21 to terminal 1 of amplifier A4, rendering it at substantially ground potential. Terminal 3 of amplifier A4 becomes positive providing a positive voltage on the base of the transistor Q4 to render it conductive and to energize the relay coil C to cause contacts K to close to activate the external alarm circuit controlled thereby. The duration of the alarm would be for a period determined by the duration of the voltage in the storage capacitor at the level above that required to trigger transistor Q3 into conductivity.

It is desirable in certain situations to have the alarm continue to sound, once it has been activated. To provide for this mode of operation, a two position switch S2, which in one position connects terminal 2 of amplifier A4 to the grounded buss B2, and in the second position connects terminal 2, through diode D3 to terminal 3. When switch S2 is in the second position when terminal 1 of amplifier A4 is reduced to ground potential, terminal 3 becomes positive and terminal 2 becomes positive through diode D3, to latch the amplifier A4 in the conductive mode. This enables the alarm to be continuously activated, when once it is activated. To silence the alarm, switch S2 must be moved to its first position to couple terminal 2 to ground.

Relay contacts K control a remotely positioned alarm or indicator as may be desired. There is provided a built-in alarm system comprising a multivibrator and a speaker that produces a siren-like sound. The multivibrator is comprised of a pair of NAND gates G1 and G2 coupled through a switch S3 to the voltage buss B1 which suplies its voltage. Terminal 2 of gate G1 is connected to collector of transistor Q4 from which the voltage is provided to turn on the multivibrator. Terminal 3 of Gate G1 is connected to terminal 3 of Gate G2, which is also connected through resistor R25 and capacitor C12 to terminal 4 of gate G1. Terminal 1 of gate G2 is grounded while terminal 2 of gate G2 is connected through resistor R23 and capacitor C11 to the output of the amplifier A3.

The output of the multivibrator is coupled through resistor R26 to the base of the transistor Q5, whose emitter is connected to the base of transistor Q6, whose emitter is connected to ground. The collector of transistor Q5 and collector of transistor Q6 is connected through switch S3 to the voltage buss B1. The coil of the speaker SP is in the collector circuit of the transistor Q6. Terminals 2 and 3 are connected through resistor R23 and capacitor C11 to the output of amplifier A3.

When transistor Q4 becomes conductive, the multivibrator is activated to produce a siren-like sound from the speaker. If there is continued movement in the field of view of the sensory means, a voltage pulse would be produced through capacitor C11 and resistor R23 to cause the multivibrator to be modulated and in turn to modulate the siren-like sound from the speaker. This modulation continues only so long as the movement continues in the field of view of the sensory means.

The apparatus also includes an auto-reset provision, where by the alarm will sound for a predetermined period of time and will be silenced by a reset operation. If there is continued motion in the field of view of the apparatus, the reset means will be "refreshed," that is, it will be prevented from operating for a predetermined time interval after all motion in the field of view ceases.

The amplifier A4 has terminal 1 connected by resistor R21 to the circuit containing resistor R20 and capacitor C10, connected between the busses B1 and B2. The transistor Q3 when conductive, shorts the capacitor C10 and causes its discharge. While transistor Q3 is non-conductive, which is its state untill the charge in capacitor C8 reaches a predetermined level, the voltage across capacitor C10 is applied to terminal 1 of amplifier A4. Under this condition, the voltage at terminal 3 of amplifier A4 is at ground potential and the transistor Q4 is non-conductive.

When the charge on capacitor C8 reaches a predetermined level, the charge on capacitor is disipated through transistor Q3 and terminal 1 of amplifier A4 becomes at ground potential and terminal 3 becomes positive and the alarm circuits are energized by the conduction of transistor Q4.

So long as there is motion within the field of view of the sensory means of the apparatus, the capacitor C8 will be refreshed and the alarm will continue to be sounded.

However, once motion ceases in the field of view of the sensory means and the charge level in the capacitor C8 drops below the level at which transistor Q3 conducts, it becomes non-conductive. The potential on terminal 1 of the amplifier A4 does not immediately return to that of high value until the capacitor C10 becomes charged through resistor R20. This delays the reset operation for a predetermined time interval after the motion in the field of view of the sensory means ceases.

Connected between terminal 3 of amplifier A4 and the base of transistor Q3 is a circuit containing resistor R19 and capacitor C9. The function of this circuit is to connect the potential of terminal 3 to the base of transistor Q3, so that, even though the charge on capacitor C8 has dropped below the level necessary to maintain transistor Q3 conductive, it will remain conductive for a little longer period necessary for the remaining charge on the capacitor C8 to be discharged through the base — emitter circuit of transistor Q3. This is essential for the capacitor C8 to always start counting from the same point, that is from a fully discharged condition.

The intrusion detector apparatus also includes an arming circuitry, whereby, it can be set in operating condition after the elapse of a predetermined time interval after being turned on, thus permitting the user to escape from the view of view without triggering the alarm.

This system comprises a capacitor C6 and a single pole double throw switch S1 connected in series between the voltage buss B1 and the grounded buss B2. Terminal 1 of the switch is connected to the bus B1 and terminal 3 of the switch S1 is connected to the capacitor C6. Terminal 2 of the switch S1 is connected to the positive terminal of the battery VCC, whose negative terminal is connected to ground and to buss B2.

The capacitor C6 is shunted by a bleed resistor R11, which determines the time period for the capacitor C6 to discharge after the battery is disconnected therefrom. The voltage across the capacitor C6 is connected through resistor R27 to terminal 1 of the amplifier A4 and through resistor R9 to the base of transistor Q1, whose collector is connected to the buss B1 and whose emitter is connected through resistor R5 and light emitting diode LED to the grounded buss B2. The emitter of the transistor Q1 is further connected through resistor R7 and diode D2 to terminal 1 of the amplifier A3.

When the switch S1 is in the position as shown in the drawings, the buss B1 has no voltage thereon. The battery VCC is connected across the capacitor C6 and it is charged and maintained in its charged state. This voltage is applied across the base-emitter circuit of transistor Q1, but since there is no voltage across its collector-emitter circuit the transistor Q1 does not conduct and the light emitting diode LED will be darkened as the base-emitter current is inadequate to cause it to emit light. The voltage of the emitter of transistor Q1 is applied through resistor R7 and diode D2 to terminal 1 of amplifier A3 and it is positive, such that amplifier A3 is rendered inoperative, presenting a negative voltage at terminal 3 thereof.

When the switch S1 is moved into its upper position to connect terminals 1 and 3 thereof, the voltage of the battery VCC is then connected between the busses B1 and B2 to activate the circuitry. At this time, the transistor Q1 conducts to cause the diode LED to emit light, indicating that the apparatus is in the process of being armed. At the same time, terminal 1 of amplifier A3 will be maintained at the positive potential of buss B1 and by reason of this voltage will block the transmission of any signal voltages therethrough. Also, the voltage is applied through resistor R25 to terminal 1 of amplifier A4 to further block the sounding of an alarm until the period that is required for the Capacitor C6 to become discharged. When the capacitor C6 becomes discharged through resistor R11 and the base-emitter circuit of transistor Q1 ceases to conduct. The light from the light emitting diode LED will be extinguished indicating that the apparatus is armed. The bias on the terminals 1 of the amplifiers A3 and A4 will be removed thus permitting signals to be amplified and transmitted to the alarm means.

The apparatus as described operates to detect an intruder within a field of view upon which its sensory means is focused, through the detection of motion or changing light patterns on the cells and on the grid structures thereof. The motion of the intruder, as described, causes the image of him to traverse not only the cells moving from cell to cell, but also to traverse the grids of the grid structure on the face of the cells. This produces alternating changes in the resistance of the cells, one having a low frequency and the other having a higher frequency.

The cells and the grid structure are connected in a bridge circuit to which is connected a source of voltage, whereby the alternating changes in the resistance is converted to alternating voltages of two frequencies that are produced as the result of the structure of the sensory means. While a bridge circuit is illustrated and described, it is obvious that other configurations of the array of cells in the retina may be provided in its stead. It is also conceived that the grid structures could be designed in such manner as to provide in the resulting signal other information concerning the intrusion, as for example, the direction of motion, the amount of motion and the rate of motion. The present invention is not intended to be limited to the particular design of the grid structure that is herein disclosed.

While the structure of the retina of the sensory means provides characteristics in the output signal that enable the apparatus to be more discriminating in its response in regard to moving targets there are signals producing alternating voltage having frequencies that are outside the range of frequencies produced as the result of motion and the grid structure. An example of these would be the sixty or one hundred and twenty cycle alternating voltages due to the character of the illuminating means that covers the field of view of the sensory means. This signal is produced as the result of all the cells being influenced by the changing light but differently in different parts of the field of view. There is the case of flashing signs which cause the light entering a window and being seen by only one cell or part of a cell which would have its resistance modulated relative to that of the other cells that would cause a signal having a frequency representing the frequency of the flashing light. These outside influences produce signals in the sensory means of a character depending on the character of the influence as distinguished from those which has additional characteristics introduced by reason of the structure of the sensory means.

The outside influence that causes the most trouble in providing a reliable intrusion detecting apparatus is the light of cars or reflected from cars moving outside the field of view of the sensory means which penetrates the space encompassed by the field of view and which produce moving light patterns. The image of these light patterns traverse the cells and the grid thereof and produce signals which are very similar and are hard to discriminate between.

Most, if not all, of the signals due to these changes in light patterns on the cells are eliminated from the final portions of the processing apparatus by the provision of simple band pass filters and by band pass filters in the feedback circuits of the amplifiers.

In the case of the signals produced by moving light patterns, as those produced on the one hand by motion of an intruder in the field of view and those produced by light from moving vehicles that enter the field of view, in the past it has been difficult to discriminate between. It has been discovered that there is a difference in velocity with which the two patterns of light move across the cells and that even a slight difference in the velocities, that the difference can be magnified by the use of grid structure of the cells to produce the higher frequency alternations in response to movement. If only the cells were used to produce the alternating signal in response to motion of the images, the difference between the two signals would be in the order of a few cycles, which is substantially impossible to discriminate between. On the other hand, when the grid structure of the cells is used to produce the alternating signals, as is possible in the present invention, because the size of the image of the intruder is made small relative to the area of the cells, and the small variations in the voltage produced in the grids can be detected, the differences in the frequencies of the signals are magnified. Being magnified from a few cycles to many times the few cycles, it is more easily processed to discriminate there between.

Another distinction in the two signals, such as those produced by moving patterns of light and those produced by a moving intruder would be the composition of the signals. As to the moving pattern of light, its image is not compact nor is it as uniform as that provided by an intruder. Consequently, as the light pattern traverses the retina of the sensory means, there are likely to be several signals of different phase differences because of the spread of the image of the pattern over a larger extent of the retina and all traveling at the same velocity. The differences in the phases of the different signals produce at the output of the bridge means a composite signal that comparable to that produced by noise. On the other hand, the intruder produces a more confined image of substantially uniform light intensity that extend over a comparatively a small number of grids of the cell, a signal would be produced that would be comparatively uniform in amplitude and a different frequency. A certain amount of discrimination on the basis of these differences is also possible in the present apparatus, particularly in the level detector amplifier, wherein those alternations of low amplitude because of cancellation due to phase differences and the character of the sensory circuit that poses variations in different parts thereof, would be eliminated. In other words, should a light pattern caused by a passing vehicle sweep the cells of the sensory means, and because of the manner in which the cells are electrically connected, the resistance variations in the various cells would be posed against each other and the phase of the various signals, produced by different part of the pattern, the number of alternations resulting in pulses at the output of the level detector would be lessened by the fact that some of the alternations would be below the detecting level of the level detector. Thus though the pattern of light traverses the entire array of cells and grids thereof, the frequency and number of pulses resulting from the output of the level detector may be less than that required to trigger the alarm.

In the processing apparatus, after those signals which have frequencies outside the band pass range have been excluded, the level detector responds only to those alternations which have a predetermined amplitude. The level detector does not respond to those alternations that have an amplitude below the threshold of the level detector thus the noise is substantially entirely eliminated. The signal at the output of the level detector is composed of pulses of uniform amplitude but with random width or duration. The frequency of such pulses, or more correctly the repetition rate thereof due to the detection of motion of an intruder will be more uniform than those resulting from the detection of the moving light pattern caused by a passing vehicle.

The signal is coupled through the capacitor C7 and resistor R15 to the transistor Q2, whereby through a differentiating action the output from transistor Q2 are pulses of uniform amplitude and uniform duration or width, or as is termed "unitized pulses." These pulses are fed through the circuit to the storage or memory ccapacitor C8, which has a shunt bleed circuit that bleeds off unitized pulses at a predetermined uniform rate. Thus the repetition rate of the pulses must exceed the rate at which the pulses of charge are bled from the capacitor C8 for the voltage appearing across the capacitor C8 to attain a level adequate to trigger the transistor Q3 into conductivity.

Prior to the conductive state of transistor Q3, the circuit containing resistor R20 and capacitor C10 applies through resistor R21, the positive voltage appearing across capacitor C10 on the terminal 1 of amplifier A4. So long as this positive voltage appears on terminal 1, terminal 3 is at a ground potential and transistor Q4 is non-conductive and no alarm signal or indication would be provided.

When transistor Q3 becomes conductive the charge on capacitor C10 is disipated and terminal 1 of amplifier A4 is grounded causing terminal 3 to become positive with respect to ground thus trigger transistor Q4 into conductivity and activating the alarm systems. While switch S2 is in the position shown, terminal 2 is maintained at ground potential.

As soon as motion in the field of view ceases or is reduced to such a level that the repetition rate of the pulses fed to the capacitor C8 is reduced below the bleed rate, the voltage decreases, thus, rendering the transistor Q3 non-conductive. When this occurs, capacitor C10 begins to charge up through resistor R20 to raise the potential on terminal 1 of amplifier A4 to terminate the alarm or in effect to reset the apparatus.

When switch S2 is in the other position the voltage from terminal 3 is applied through diode D3 to terminal 2, to latch the alarm in its "on" mode. To silence the alarm in absence of continued motion in the field of view, requires that the switch S2 be returned to its right hand position.

The operation of the arming device has been already adequately disclosed and the operation of the complete apparatus has been fully described.

The invention herein disclosed has broader utilization than as a part of an intrusion detecting apparatus.

What is claimed is set forth in the following claims:

1. A detecting apparatus responsive to motion within a predetermined space having a sensory means comprising:

lens means which when directed towards said predetermined space will produce an image thereof in a spherical surface spaced at the focal length from said lens;

a retina comprising of a plurality of photoresitive cells arranged in a line in said spherical surface, said cells each having surfaces facing said lens means upon which is deposited a serpentine like configuration of photosensitive material forming grids across the surfaces of said cells, and said cells being oriented such that the grids traverse the direction of said line of cells;

a source of voltage connected to said cells for converting changes in the resistance therein due to changes in the light pattern focused thereon into changes in voltage;

and indicator means responsive to changes in the voltage across said cells produced by motion of a part of the image thereon traversing the cells and to changes in the voltage of said cells produced by motion of the part of the image thereon traversing the grids of the individual cells for producing an indication that there is motion in the predetermined space.

2. A detecting apparatus as set forth in claim 1 wherein;

said lens means produces an image of the predetermined space with its parts thereof distributed between the line of cells, and wherein the objects in said space produce images which will be smaller in area than the area of the individual cells, and wherein when the image of movable objects in said space traverse said grids a voltage signal of one frequency will be produced and when the image traverses said individual cells a signal of a lower frequency will be produced.

3. A detecting apparatus as set forth in claim 2, wherein;

the grids formed on said cells are spaced such that the image of objects in said predetermined space will cover only a small portion of the total number of grids on the individual cells, whereby the traversal of said grids will produce a signal of high frequency than that produced by the image of a movable object traversing said individual cells.

4. A detecting apparatus as set forth in claim 2, wherein;

said indicator means includes means for segregating signals according to their frequency content and for amplifying and passing only those signals producing the frequencies due to the traversal of the image of the movable object across the individual cells and the grids of the individual cells.

5. A detecting apparatus as set forth in claim 2, wherein said indicator means comprises;

bandpass filters to eliminate voltage changes except those due to motion of an object within said predetermined space;

amplifying means for increasing the amplitude of voltage changes due to motion within said predetermined space;

level detector means for converting said changes above a predetermined level into pulses having a uniform amplitude;

a pulse width normalizer wherein said pulses of uniform amplitude are converted into pulses having both uniform amplitude and uniform pulse width; and means responsive to the repetition rate of said pulses of uniform amplitude and uniform pulse width above a predetermined repetition rate per unit of time for producing said indication.

6. An intrusion detecting apparatus responsive to motion within a given space for sounding an alarm when an intruder enters said space, said apparatus comprising:

lens means which when directed towards said given space will produce an image thereof in a focal surface;

retina means comprising of a plurality of cells arranged in a line in said focal surface, said cells comprising means forming an insulating surface; and and a serpentine-like configuration of photosensitive material deposited on said insulating surface to form grids transverse of said cells, said cells being oriented such that said grids are at an angle to the line of cells and the grids of each cell is at an angle relative to the grids of each adjacent cell;

a source of voltage connected to said serpentine-like configuration of photosensitive material to convert the resistance changes therein into voltage changes; and alarm means responsive to changes in voltage across said cells produced by motion of an image traversing said cells and the grids of the individual cells for producing an alarm signal.

7. The invention as set forth in claim 6;

wherein said lens is formed to distribute the image of said space between the individual cells and the image of objects in said space occupy an area less than the area of the individual cells; and whereby when an intruder enters said space, and his image traverses said cells and the grids of the individual cells a voltage signal will be produced having two distinctly different frequencies, whereby said apparatus is sensitive to a wide range of velocities of possible motion of the intruder.

8. The invention as set forth in claim 7;

wherein the grids formed on said cells are spaced such that the image of objects in said given space will cover only a fraction of the total number of grids of the individual cells, whereby traversal of said grids by the image of an intruder will produce a signal of higher frequency than that produced by the same image traversing the individual cells, to provide for detection of a smaller degree of motion of the intruder in the given space.

9. An intrusion detecting apparatus as set forth in claim 6 wherein said alarm means comprises:

bandpass filters to eliminate voltage changes other than those due to motion of the intruder within said given space;

amplifying means for increasing the amplitude of said voltage changes due to motion of the intruder within said given space;

level detector means for converting said voltage changes above a predetermined amplitude into pulses having a uniform amplitude;

a pulse width normalizer wherein said pulses of uniform amplitude produces pulses having both uniform amplitude and pulse widths; and means responsive to the repetition rate of said pulses of uniform amplitude and pulse width above a predetermined repetition per unit of time for producing an alarm signal indicative that intrusion has taken place.

* * * * *